I. D. PERRY.
LOCKING DEVICE FOR AUTOMOBILES.
APPLICATION FILED DEC. 7, 1916.
1,282,121.  Patented Oct. 22, 1918.
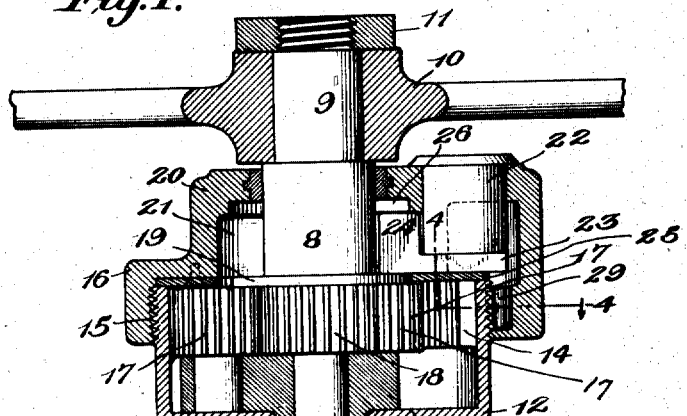
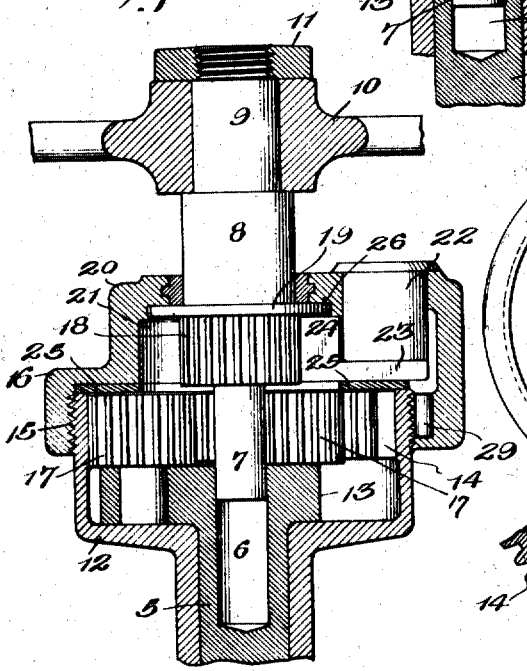
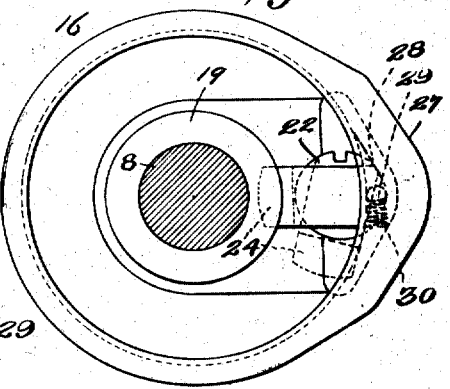
INVENTOR.
Ira D. Perry
BY Jones, Addington, * *****
ATTORNEYS

UNITED STATES PATENT OFFICE.

IRA D. PERRY, OF CHICAGO, ILLINOIS, ASSIGNOR, BY MESNE ASSIGNMENTS, TO PERRY AUTO LOCK COMPANY.

LOCKING DEVICE FOR AUTOMOBILES.

1,282,121.   Specification of Letters Patent.   Patented Oct. 22, 1918.

Application filed December 7, 1916. Serial No. 135,609.

*To all whom it may concern:*

Be it known that I, IRA D. PERRY, a citizen of the United States, residing at Chicago, in the county of Cook and State of Illinois, have invented new and useful Improvements in Locking Devices for Automobiles, of which the following is a full, clear, concise, and exact description, reference being had to the accompanying drawing, forming a part of this specification.

My invention relates to improvements in locking devices for automobiles, having special reference to means for locking the steering wheel in either operative or inoperative position.

A further object is the production of a device of few operative parts that can be readily applied to cars now in use.

A further object is the production of a device that is applicable to cars of the Ford type using planetary gear.

A further object is the production of a device that can be cheaply constructed and one not liable to get out of order or to disarrangement of its parts.

These and such other objects as may hereinafter appear, are attained by my device, in which—

Figure 1 represents a vertical sectional view of my device showing the gearing in operative position.

Fig. 2 represents a view similar to Fig. 1, with the gearing out of operative position.

Fig. 3 represents a bottom plan view of the cap removed from the housing with ring 25 removed.

Fig. 4 represents a sectional view on the line 4—4 of Fig. 1, looking in the direction indicated by the arrows.

Like numerals of reference indicate like parts in the several figures of the drawings.

Referring now to the drawings, 5 represents the steering column of an automobile, the top of which is provided with a cylindrical recess 6, within which is mounted the reduced end 7 of a stud shaft 8. The stud shaft is reduced at 9 and the ordinary steering wheel 10 fitted thereon and held in place by means of the screw cap 11. At the top of the steering column is a cylindrical housing 12, held against upward movement by the shoulders 13 of the steering column. The upper portion of the interior periphery of the housing is formed with an internal toothed rack 14 and the outer periphery is threaded at 15 to permit the screw cap 16 to be screwed in place, protecting the interior of the housing. Mounted on pins within the housing are a plurality of pinions 17 meshing with the rack 14 on the interior periphery of the housing and also meshing with the pinion 18 rigidly secured on the stud shaft 8. This stud shaft is provided with a peripheral flange or collar 19 extending beyond the circumference of the pinion 18. The cap 16 is provided with an upwardly extending portion 20 having an interior space 21 of sufficient diameter to permit the passage of the flange 19 when the stud shaft is moved upwardly.

Mounted within the cap is a lock 22, the bolt engaging arm of which engages the bolt 23 having an enlarged end 24 extending upwardly and adapted to be swung about the outer periphery of the lock barrel. A supporting plate or ring 25 is secured to the interior surface of the cap and below the bottom of the bolt 23, serving as a support and guide for the bolt itself. When the pinion 18 is meshed with the pinions within the housing, the bolt 23 can be turned so that the enlarged portion 24 rests upon the upper surface of the flange 19, thus holding the stud shaft in place and preventing the demeshing of the pinions. When it is desired to disconnect the steering gear by raising the stud shaft and demeshing the pinions, the lock bolt 24 is swung about into the position shown in dotted lines in Fig. 3, the wheel and stud shaft is lifted, the flange 19 coming within the upper recess 26 in the cap, and the bolt again swung into place as shown in Fig. 2, fitting below the under surface of the flange 26, thus holding the stud shaft in raised position and with the pinion 18 out of engagement with the pinions of the planetary gear. In this position, therefore, the wheel spins on the stud shaft without any engagement with the steering mechanism.

In Fig. 4 I have shown the means of preventing tampering with the cap or removing it after it is once properly assembled in place. On one side the cap is slightly enlarged as shown at 27 and a recess 28 is provided between the outer periphery of the housing and the inner face of the cap. This opening is enlarged at one end and a ball or pin 29 is dropped therein and a spring 30 interposed between the ball or pin and the end 31 of the receptacle. The receptacle tapers to a point 32 at one end. This recess is positioned below the lock cylinder 22, so when the lock cylinder is in place access to the recess is impossible.

When the cap is screwed in place and before the lock is inserted, the pin or ball and spring are dropped in place as shown in Fig. 4. The lock is then put in place and the cap screwed on. The ball or pin in no way prevents the rotation of the cap in the direction of the pointed end of the recess as the spring permits the retraction of the ball. If, however, any one attempts to unscrew the cap or turn the cap in the opposite direction, *i. e.*, in a direction to remove the cap, the ball or pin immediately becomes wedged in the restricted end of the recess, thus absolutely preventing the rotation of the cap and its consequent removal from the housing. While I have shown this method of locking the cap in place, there are numerous other methods that may be employed which come well within the spirit of my invention.

This form of my device is especially applicable to the cars known as the Ford cars, but can also be applied to any car using a planetary gear in the steering mechanism.

The necessity for a device of this character is urgent, as cars are being stolen in great numbers daily throughout the United States regardless of the character of the lock mechanism used to prevent such theft. Any other mechanism used can be either broken or removed and the car operated, but in my device it is a practically impossible task to remove the cap without having the key to the lock and as the locks are made with individual keys and no two locks are the same, it is practically impossible to pick the lock and thus place the pinions in mesh when they have once been locked in a demeshed position.

I claim:

1. In a steering head for an automobile the combination with a steering post, fixed against lengthwise movement, a housing mounted relatively to said post, a planetary gearing in said housing, of a stud shaft, a steering wheel on said stud shaft, a pinion fixed to said stud shaft, said stud shaft being mounted for lengthwise movement relatively to the steering post, whereby the said pinion may be meshed and demeshed with said planetary gearing, and a cap for said housing the top of which is spaced from the gearing to permit of the lengthwise movement of the stud shaft and its pinion.

2. In a steering head for an automobile, the combination with a steering post fixed against lengthwise movement, a housing mounted concentric with said post, a planetary gearing in said housing, of a stud shaft mounted to move lengthwise, and means operated by the endwise movement of the stud shaft whereby the planetary gearing may be operative or inoperative according to the position of said stud shaft, and a cap for said housing the top of which is spaced from the gearing to permit the lengthwise movement of said stud shaft, a flange carried by the shaft and positioned above the pinion to limit the endwise movement of the stud shaft.

3. In a steering head for an automobile, the combination with a steering post fixed against lengthwise movement, a housing mounted concentric with said post, a planetary gearing in said housing, of a stud shaft mounted to move lengthwise, and means operated by the endwise movement of the stud shaft whereby the planetary gearing may be operative or inoperative according to the position of said stud shaft, and a cap for said housing the top of which is spaced from the gearing to permit the lengthwise movement of said stud shaft, means carried by the shaft to limit the endwise movement of the shaft in both directions.

4. A locking device for motor vehicles, comprising a steering post, a steering wheel having a stud shaft movable lengthwise of said post, a planetary gear connection between said post and stud shaft, one pinion of which is mounted on said stud shaft, and arranged to be demeshed from the other pinion of the planetary gear, a lock bolt arranged to support said pinion out of mesh with the other pinions, and locking means associated with said bolt for moving it into and out of position supporting said pinion.

5. A locking device for motor vehicles, comprising a steering post, a steering wheel having a stud shaft movable lengthwise of said post, a planetary gear connection between said post and stud shaft, including a pinion fast on the stud shaft and capable of being demeshed from other pinions of the planetary gear, a flange on said stud shaft above the pinion, a movably mounted lock bolt, one end of which is arranged when in one position to engage said flange and support the pinion in demeshed condition, and locking means operatively connected with said bolt, whereby the latter is moved into position supporting said pinion in demeshed condition.

6. A locking device for motor vehicles, comprising a steering post, a steering wheel having a stud shaft movable lengthwise of said post, a planetary gear connection between said post and stud shaft including a pinion fast on the stud shaft and capable of being demeshed from other pinions of the planetary gear, a flange on said stud shaft above the pinion, a movably mounted lock bolt, one end of which is arranged when in one position to engage said flange and support the pinion in demeshed condition, and key operated lock mechanism, having a bolt engaging arm for reciprocating said bolt.

In witness whereof, I have hereunto subscribed my name.

IRA D. PERRY.

Witnesses:
F. E. JOHNSON,
EDITH ANDERSON.